United States Patent
Burrows et al.

(10) Patent No.: US 10,247,997 B2
(45) Date of Patent: Apr. 2, 2019

(54) SWITCHABLE HYDRIDE SMART WINDOW AND THE METHODS FOR PRODUCING THE SAME

(71) Applicant: Cardinal CG Company, Eden Prairie, MN (US)

(72) Inventors: Keith James Burrows, Mineral Point, WI (US); Klaus H. W. Hartig, Avoca, WI (US); Daniel J. Plaggemeyer, Sauk City, WI (US)

(73) Assignee: CARDINAL CG COMPANY, Eden Prairie, MN (US)

( * ) Notice: Subject to any disclaimer, the term of this patent is extended or adjusted under 35 U.S.C. 154(b) by 0 days.

(21) Appl. No.: 15/677,302

(22) Filed: Aug. 15, 2017

(65) Prior Publication Data
US 2018/0052376 A1  Feb. 22, 2018

Related U.S. Application Data (60) Provisional application No. 62/375,647, filed on Aug. 16, 2016.

(51) Int. Cl.
*G02F 1/19* (2006.01)
*G02F 1/1523* (2019.01)
*G02F 1/153* (2006.01)

(52) U.S. Cl.
CPC ............. *G02F 1/19* (2013.01); *G02F 1/1523* (2013.01); *G02F 2001/1536* (2013.01); *G02F 2201/501* (2013.01); *G02F 2202/34* (2013.01)

(58) Field of Classification Search
CPC ....... B82Y 20/00; G02F 1/01708; G02F 1/01; G02F 1/0126; G02F 1/19

(Continued)

(56) References Cited

U.S. PATENT DOCUMENTS

| 3,748,017 A | 7/1973 | Yamamura et al. |
| 4,142,509 A | 3/1979 | Wilhelm et al. |

(Continued)

FOREIGN PATENT DOCUMENTS

| EP | 1345071 A1 | 9/2003 |
| EP | 1577701 A1 | 9/2005 |

(Continued)

OTHER PUBLICATIONS

International Patent Application No. PCT/US2017/046885, International Search Report and Written Opinion dated Oct. 16, 2017, 16 pages.

(Continued)

*Primary Examiner* — Mohammed A Hasan (74) *Attorney, Agent, or Firm* — Fredrikson & Byron, P.A.

(57) ABSTRACT

A switchable hydride smart window solid thin film coating having variable opacity and the methods for producing the same is described. The coating includes the following layers deposited on substrate such as glass: a switchable layer, an optional barrier layer, a catalyst layer, an optional barrier layer, a solid electrode, an ion storage layer, an optional insulating layer and a transparent conductor layer. The switchable layer is preferably formed of a magnesium alloy and ore preferable, a ternary alloy of magnesium along with two additional rare earth metals such as yttrium (Y) and Titanium (Ti), i.e., MgYTi.

16 Claims, 4 Drawing Sheets

(58) Field of Classification Search
USPC .......................................... 359/240–243, 273
See application file for complete search history.

(56) References Cited

U.S. PATENT DOCUMENTS

| | | | |
|---|---|---|---|
| 4,455,998 | A | 6/1984 | Kroontje et al. |
| 4,683,154 | A | 7/1987 | Benson et al. |
| 4,898,147 | A | 2/1990 | Doni et al. |
| 5,009,218 | A | 4/1991 | Baechli |
| 5,076,673 | A | 12/1991 | Lynam et al. |
| 5,124,185 | A | 6/1992 | Kerr et al. |
| 5,416,617 | A | 5/1995 | Loiseaux et al. |
| 5,625,742 | A | 4/1997 | Boffito et al. |
| 5,635,729 | A | 6/1997 | Griessen et al. |
| 5,643,485 | A | 7/1997 | Potter et al. |
| 5,905,590 | A | 5/1999 | Van Der Sluis et al. |
| 6,001,487 | A | 12/1999 | Ladang et al. |
| 6,072,549 | A | 6/2000 | Faris et al. |
| 6,101,298 | A | 8/2000 | Den Broeder et al. |
| 6,160,655 | A | 12/2000 | Fix et al. |
| 6,239,898 | B1 | 5/2001 | Byker et al. |
| 6,259,549 | B1 | 7/2001 | Leupolz et al. |
| 6,310,725 | B1 | 10/2001 | Duine et al. |
| 6,437,900 | B1 | 8/2002 | Cornelissen et al. |
| 6,535,323 | B2 | 3/2003 | Johnson et al. |
| 6,594,065 | B2 | 7/2003 | Byker et al. |
| 6,594,067 | B2 | 7/2003 | Poll et al. |
| 6,608,713 | B2 | 8/2003 | Ouwerkerk et al. |
| 6,640,142 | B1 | 10/2003 | Wong et al. |
| 6,647,166 | B2 | 11/2003 | Richardson |
| 6,680,790 | B2 | 1/2004 | Johnson et al. |
| 6,762,871 | B2 | 7/2004 | Yoshimura |
| 7,074,486 | B2 | 7/2006 | Boire et al. |
| 7,259,902 | B2 | 8/2007 | Yoshimura et al. |
| 7,375,871 | B2 | 5/2008 | Libretto et al. |
| 7,405,864 | B2 | 7/2008 | Uchida |
| 7,414,772 | B2 | 8/2008 | Yoshimura et al. |
| 7,646,526 | B1 | 1/2010 | Wang et al. |
| 7,679,809 | B2 | 3/2010 | Tonar et al. |
| 7,773,284 | B2 | 8/2010 | Kurman et al. |
| 7,774,997 | B2 | 8/2010 | Graf et al. |
| 7,804,635 | B1 | 9/2010 | Wang et al. |
| 7,916,380 | B2 | 3/2011 | Tonar et al. |
| 8,031,389 | B2 | 10/2011 | Wang et al. |
| 8,035,882 | B2 | 10/2011 | Fanton et al. |
| 8,085,463 | B2 | 12/2011 | Dam et al. |
| 8,102,586 | B2 | 1/2012 | Albahri |
| 8,179,588 | B2 | 5/2012 | Yamada et al. |
| 8,189,255 | B2 | 5/2012 | Yoshimura et al. |
| 8,284,472 | B2 | 10/2012 | Yoshimura et al. |
| 8,357,312 | B2 | 1/2013 | Sun |
| 8,405,896 | B2 | 3/2013 | Lamine et al. |
| 8,441,707 | B2 | 5/2013 | Lam et al. |
| 8,658,262 | B2 | 2/2014 | Myli et al. |
| 8,665,512 | B2 | 3/2014 | Friedman et al. |
| 8,699,114 | B2 | 4/2014 | McCarthy et al. |
| 8,758,691 | B2 | 6/2014 | Uchiyama et al. |
| 8,773,746 | B2 | 7/2014 | Tajima et al. |
| 8,780,432 | B1 | 7/2014 | Nguyen |
| 8,796,598 | B2 | 8/2014 | England et al. |
| 8,908,259 | B2 | 12/2014 | Friedman et al. |
| 8,947,756 | B2 | 2/2015 | Noh et al. |
| 8,976,440 | B2 | 3/2015 | Berland et al. |
| 2002/0044717 | A1 | 4/2002 | Richardson |
| 2002/0089732 | A1* | 7/2002 | Ouwerkerk ........... G02F 1/1523 359/237 |
| 2005/0254130 | A1 | 11/2005 | Graf et al. |
| 2007/0076288 | A1* | 4/2007 | Yoshimura ............ G02F 1/1525 359/267 |
| 2008/0291452 | A1* | 11/2008 | Dam .................... G01N 33/005 356/437 |
| 2010/0039692 | A1 | 2/2010 | Yamada et al. |
| 2012/0038587 | A1 | 2/2012 | Alford |
| 2013/0020113 | A1 | 1/2013 | Corbea et al. |
| 2013/0278989 | A1 | 10/2013 | Lam et al. |
| 2014/0247474 | A1 | 9/2014 | Yamada et al. |
| 2014/0340729 | A1 | 11/2014 | Tajima et al. |
| 2015/0062688 | A1 | 3/2015 | Friedman et al. |
| 2015/0077832 | A1 | 3/2015 | Berland et al. |
| 2015/0168801 | A1 | 6/2015 | Yamada et al. |

FOREIGN PATENT DOCUMENTS

| | | |
|---|---|---|
| JP | 2000204862 A | 7/2000 |
| WO | 2007126313 A1 | 11/2007 |
| WO | 2014166641 A1 | 10/2014 |

OTHER PUBLICATIONS

Manivasagam et al., "Electrochemical and Optical Properties of Magnesium-Alloy Hydrides Reviewed," Crystals, vol. 2, No. 4, Oct. 15, 2012, pp. 1410-1433.

Bao et al., "Magnesium-titanium alloy thin-film switchable mirrors," Solar Energy Materials and Solar Cells, vol. 92, No. 2, Feb. 2008, pp. 224-227.

Bao et al., "Metal buffer layer inserted switchable mirrors," Solar Energy Materials and Solar Cells, vol. 92, No. 2, Feb. 2008, pp. 216-223, Abstract Only.

Tajima et al., "All-solid-state switchable mirror on flexible sheet," Surface & Coatings Technology, vol. 202, 2008, pp. 5633-5636.

Tajima et al., "Si incorporated diamond-like carbon film-coated electrochromic switchable mirror glass for high environmental durability," Ceramics International, vol. 39, No. 7, Sep. 2013, pp. 8273-8278.

Tajima et al., "Switchable mirror glass with a Mg—Zr—Ni ternary alloy thin film," Solar Energy Materials & Solar Cells, vol. 126, 2014, pp. 227-236.

Yamada et al., "Antidazzle effect of switchable mirrors prepared on substrates with rough surface," Solar Energy Materials & Solar Cells, vol. 92, 2008, pp. 1617-1620.

Yamada et al., "Dehydrogenation process of Mg—Ni based switchable mirrors analyzed by in situ spectroscopic ellipsometry," Solar Energy Materials & Solar Cells, vol. 99, Apr. 2012, pp. 84-87.

Yamada et al., "Ellipsometric study of optical switching processes of Mg—Ni based switchable mirrors," Thin Solid Films, vol. 519, No. 9, Feb. 28, 2011, pp. 2941-2945, Abstract Only.

Yamada et al., "Film thickness change of switchable mirrors using Mg3Y alloy thin films due to hydrogenation and dehydrogenation," Solar Energy Materials & Solar Cells, vol. 126, Jul. 2014, pp. 237-240, Abstract Only.

Yamada et al., "Influence on optical properties and switching durability by introducing Ta intermediate layer in Mg—Y switchable mirrors," Solar Energy Materials & Solar Cells, vol. 125, Jun. 2014, pp. 133-137, Abstract Only.

Yamada et al., "Optical charge transfer absorption in proton injected tungsten oxide thin films analyzed with spectroscopic ellipsometry," Solid State Ionics, vol. 180, No. 6-8, May 14, 2009, pp. 659-661, Abstract Only.

Yamada et al., "Optical indices of switchable mirrors based on Mg—Y alloy thin films in the transparent state," Thin Solid Films, vol. 571, Part 3, Nov. 28, 2014, pp. 712-714, Abstract Only.

Yamada et al., "Optical switching durability of switchable mirrors based on magnesium-yttrium alloy thin films," Solar Energy Materials & Solar Cells, vol. 117, Oct. 2013, pp. 396-399, Abstract Only.

Yamada et al., "Optical switching properties of switchable mirrors based on Mg alloyed with alkaline-earth metals," Solar Energy Materials & Solar Cells, vol. 99, Apr. 2012, pp. 73-75, Abstract Only.

Yamada et al., "Pd distribution of switchable mirrors based on Mg—Y alloy thin films," Solar Energy Materials & Solar Cells, vol. 120, Part B, Jan. 2014, pp. 631-634.

Yoshimura et al., "Optical switching property of Pd-capped Mg—Ni alloy thin films prepared by magnetron sputtering," Vacuum, vol. 80, No. 7, May 31, 2006, pp. 684-687.

Transparency, BYK-Gardner GmbH, known to be publicly available at least as early as Jul. 28, 2015, 2 pages.

Yamada et al., "Hydrogenation and dehydrogenation processes of palladium thin films measured in situ by spectroscopic ellipsometry,"

(56) References Cited

OTHER PUBLICATIONS

Solar Energy Materials & Solar Cells, vol. 93, No. 12, Dec. 2009, pp. 2143-2147.
Tajima et al., Improved durability of electrochromic switchable mirror with surface coating in environment, Vacuum, vol. 87, 2013, pp. 155-159.
Ell et al., "Optical investigation of the hydrogenation and dehydrogenation mechanisms of evaporated MgNi films," Solar Energy Materials & Solar Cells, vol. 91, No. 6, 2007, pp. 503-517.
Ao et al., "Semiconducting ground-state of three polymorphs of Mg2NiH4 from first-principles calculations," International Journal of Hydrogen Energy, vol. 38, 2013, pp. 16471-16476, Abstract Only.
Wang et al., "Structure changes and optical properties of Mg2Ni switchable mirrors," International Journal of Hydrogen Energy, vol. 33, No. 23, Dec. 2008, pp. 7207-7213, Abstract Only.
Lelis et al., "A mechanically switchable metal-insulator transition in Mg2NiH4 discovers a strain sensitive, nanoscale modulated resistivity connected to a stacking fault," Journal of Alloys and Compounds, vol. 496, No. 1-2, Apr. 30, 2010, pp. 81-86, Abstract Only.
Von Rottkay et al., "Effect of hydrogen insertion on the optical properties of Pd-coated magnesium lanthanides," Electrochimica Acta, vol. 44, No. 18, May 1999, pp. 3093-3100.
Qu et al., "Hydrogen absorption-desorption, optical transmission properties and annealing effect of Mg thin films prepared by magnetron sputtering," International Journal of Hydrogen Energy, vol. 34, No. 4, Feb. 2009, pp. 1910-1915, Abstract Only.
Fry et al., "Improved hydrogen cycling kinetics of nano-structured magnesium/transition metal multilayer thin films," International Journal of Hydrogen Energy, vol. 38, No. 2, 2013, pp. 982-990, Abstract Only.
Isidorsson et al., "Structural, optical and electronic properties of LaMgHx switchable mirrors," Electrochimica Acta, vol. 46, No. 13-14, Apr. 2, 2001, pp. 2179-2185.
Di Vece et al., "Structure of the Mg2Ni switchable mirror: an EXAFS investigation," Materials Chemistry and Physics, vol. 91, 2005, pp. 1-9.
Lohstroh et al., "Double layer formation in Mg—TM switchable mirrors (TM: Ni, Co, Fe)," Journal of Alloys and Compounds, vol. 490, 2005, pp. 404-406, Abstract Only.
Shalaan et al., "Mg nanoparticle switchable mirror films with improved absorption-desorption kinetics," Surface Science, vol. 600, No. 18, Sep. 2006, pp. 3650-3653.
Mercier et al., "Toward solid-state switchable mirrors using a zirconium oxide proton conductor," Solid State Ionics, vol. 145, No. 1-4, Dec. 2001, pp. 17-24.
Janner et al., "Cycling durability of switchable mirrors," Electrochimica Acta, vol. 46, 2001, pp. 2173-2178.
Giebels et al., "Highly reflecting Y/Mg—Hx multilayered switchable mirrors," Journal of Alloys and Compounds, vol. 330-332, Jan. 17, 2002, pp. 875-881.
Slack et al., "Metal hydride switchable mirrors: Factors influencing dynamic range and stability," Solar Energy Materials & Solar Cells, vol. 90, 2006, pp. 485-490.
Lemarchand et al., "Smart Switchable Technologies for Glazing and Photovoltaic Applications," Energy Procedia, vol. 57, 2014, pp. 1878-1887.
Farangis et al., "Structural and electronic properties of magnesium-3D transition metal switchable mirrors," Solid State Ionics, vol. 165, No. 1-4, Dec. 2003, pp. 309-314.
Richardson, "Phase transitions in non-hydride switchable mirror thin films," Phase Transitions, vol. 81, No. 7-8, 2008, pp. 807-813.
Mooij et al., "Interface Energy Controlled Thermodynamics of Nanoscale Metal Hydrides," Advanced Energy Materials, vol. 1, No. 5, Oct. 2011, pp. 754-758, Abstract Only.
Fry et al., "Catalysis and evolution on cycling of nano-structured magnesium multilayer thin films," International Journal of Hydrogen Energy, vol. 39, No. 2, Jan. 2014, pp. 1173-1184.
Westerwaal, "Growth, microstructure and hydrogenation of Pd-catalyzed complex metal hydride thin films," Vrije Universiteit, Thesis, Jun. 2007, 150 pages.
Baetens et al., "Properties, Requirements and Possibilities of Smart Windows for Dynamic Daylight and Solar Energy Control in Buildings: A State-of-the-Art Review," Solar Energy Materials & Solar Cells, vol. 94, No. 2, Feb. 2010, pp. 87-105, Abstract Only.
Ding et al., "Effects of nonmetal element (B, C and Si) additives in Mg2Ni hydrogen storage alloy: A first-principles study," International Journal of Hydrogen Energy, vol. 37, No. 8, Apr. 2012, pp. 6700-6713, Abstract Only.
Notten, "Electrochromic metal hydrides," Current Opinion in Solid State and Materials Science, vol. 4, No. 1, Feb. 1999, pp. 5-10, Abstract Only.
Barcelo et al., "High throughput optical characterization of alloy hydrogenation," International Journal of Hydrogen Energy, vol. 35, No. 13, Jul. 2010, pp. 7228-7231, Abstract Only.
Gautam et al., "Influence of Sputtering Gas on Morphological and Optical Properties of Magnesium Films," Journal of Materials Science & Technology, vol. 27, No. 1, Jan. 2011, pp. 51-58.
Paillier et al., "Influence of the deposition atmosphere on the characteristics of Pd—Mg thin films prepared by pulsed laser deposition," Thin Solid Films, vol. 500, No. 1-2, Apr. 2006, pp. 117-123, Abstract Only.
Le-Quoc et al., "MgH2 thin films deposited by one-step reactive plasma sputtering," International Journal of Hydrogen Energy, vol. 39, No. 31, Oct. 2014, pp. 17718-17725, Abstract Only.
Bouhtiyya et al., "Pd/Mg/Pd thin films prepared by pulsed laser deposition under different helium pressures: Structure and electrochemical hydriding properties," International Journal of Hydrogen Energy, vol. 34, No. 14, Jul. 2009, pp. 5778-5784.
Granqvist, "Switchable glazing technology for eco-efficient construction," Nanotechnology in Eco-Efficient Construction, 2013, pp. 236-269.
Tang et al., "Analysis and improvement of cyclic stability of H2 sensing properties of Pd/Mg—Ni films," International Journal of Hydrogen Energy, vol. 36, No. 16, Aug. 2011, pp. 10188-10196, Abstract Only.
Walze et al., "Combination of microstructures and optically functional coatings for solar control glazing," Solar Energy Materials and Solar Cells, vol. 89, 2005, pp. 233-248.
Hou et al., "Effect of Al content on the phase structure and the hydrogenation characteristic of La(Mg1—xAlx) alloys," Rare Metals, vol. 25, No. 6, Dec. 2006, pp. 654-658.
Wang et al., "Effect of Cr substitution by Ni on the cycling stability of Mg2Ni alloy using EXAFS," International Journal of Hydrogen Energy, vol. 39, No. 27, Sep. 2014, pp. 14858-14867, Abstract Only.
Ostenfeld et al., "Effect of oxygen on the hydrogenation properties of magnesium films," Surface Science, vol. 600, No. 6, Mar. 2006, pp. 1363-1368, Abstract Only.
Richardson et al., "X-Ray absorption spectroscopy of transition metal-magnesium hydride thin films," Journal of Alloys and Compounds, vol. 356-357, Aug. 2003, pp. 204-207.
Dietrich et al, "Hydrogen sorption and desorption kinetics and hydrogenation stability of Mg-metal-hydride thin films," Sensors and Actuators A: Physical, vol. 206, Feb. 2014, pp. 127-131.
Richardson, "New electrochromic mirror systems," Solid State Ionics, vol. 165, No. 1-4, Dec. 2003, pp. 305-308.
Ares et al., "Non-isothermal desorption process of hydrogenated nanocrystalline Pd-capped Mg films investigated by Ion Beam Techniques," International Journal of Hydrogen Energy, vol. 39, No. 6, Feb. 2014, pp. 2587-2596, Abstract Only.
Siviero et al., "Structural evolution of Pd-capped Mg thin films under H2 absorption and desorption cycles," International Journal of Hydrogen Energy, vol. 34, No. 11, Jun. 2009, pp. 4817-4826.
Lelis et al., "Substrate effects on formation and hydrogenation of Mg—Ni films," Applied Surface Science, vol. 263, Dec. 2012, pp. 202-209.
Wang et al., "Synchrotron EXAFS studies of Ti-doped Mg2Ni alloy on the cycling behavior," International Journal of Hydrogen Energy, vol. 39, No. 25, Aug. 2014, pp. 13824-13831.

(56) References Cited

OTHER PUBLICATIONS

Shalaan et al., "Ag enhances optical and switching properties of gadolinium hydride films," Journal of Alloys and Compounds, vol. 504, No. 1, Aug. 2010, pp. 233-236.

Anders et al., "Electrochromically switched, gas-reservoir metal hydride devices with application to energy-efficient windows," Thin Solid Films, vol. 517, No. 3, Dec. 2008, pp. 1021-1026, Abstract Only.

Radeva et al., "Highly sensitive and selective visual hydrogen detectors based on YxMg1—x thin films," Sensors and Actuators B: Chemical, vol. 203, Nov. 2014, pp. 745-751.

Gautam et al., "Hydrogen absorption and optical properties of Pd/Mg thin films prepared by DC magnetron sputtering," International Journal of Hydrogen Energy, vol. 37, No. 4, Feb. 2012, pp. 3772-3778.

Jangid et al., "Hydrogenation and annealing effect on electrical properties of nanostructured Mg/Mn bilayer thin films," International Journal of Hydrogen Energy, vol. 37, No. 4, Feb. 2012, pp. 3786-3791.

Jensen et al., "X-ray photoelectron spectroscopy investigation of magnetron sputtered Mg—Ti—H thin films," International Journal of Hydrogen Energy, vol. 38, No. 25, Aug. 2013, pp. 10704-10715.

Tan et al., "Thermodynamics, kinetics and microstructural evolution during hydrogenation of iron-doped magnesium thin films," International Journal of Hydrogen Energy, vol. 36, No. 16, Aug. 2011, pp. 9702-9713.

Gautam et al., "Hydrogenation of Pd-capped Mg thin films prepared by DC magnetron sputtering," Applied Surface Science, vol. 257, No. 14, May 2011, pp. 6291-6295, Abstract Only.

Tan et al., "Nano-scale bi-layer Pd/Ta, Pd/Nb, Pd/Ti and Pd/Fe catalysts for hydrogen sorption in magnesium thin films," International Journal of Hydrogen Energy, vol. 34, No. 18, Sep. 2009, pp. 7741-7748, Abstract Only.

Qu et al., "Superior hydrogen absorption and desorption behavior of Mg thin films," Journal of Power Sources, vol. 186, No. 2, Jan. 2009, pp. 515-520.

Bao et al., "The effect of polymer coatings on switching behavior and cycling durability of Pd/Mg—Ni thin films," Applied Surface Science, vol. 253, No. 14, May 2007, pp. 6268-6272, Abstract Only.

Song et al., "The topography of magnetron sputter-deposited Mg—Ti alloy thin films," Materials Chemistry and Physics, vol. 125, No. 3, Feb. 2011, pp. 548-552, Abstract Only.

Baldi et al., "Mg—Ti—H thin films as switchable solar absorbers," International Journal of Hydrogen Energy, vol. 33, No. 12, Jun. 2008, pp. 3188-3192.

* cited by examiner

SWITCHABLE HYDRIDE SMART WINDOW AND THE METHODS FOR PRODUCING THE SAME

RELATED APPLICATIONS

This application claims priority to U.S. Provisional Patent Application No. 62/375,647, filed Aug. 16, 2016, the teachings of which are incorporated herein by reference.

FIELD OF THE INVENTION

The present invention relates generally to switchable solid thin film coatings for glass and other substrates. More particularly, this invention relates to a switchable hydride smart window that can have variable opacity and the methods for producing the same.

BACKGROUND OF THE INVENTION

A variety of switchable coatings are known in the art. Oftentimes they are referred to as smart glass or switchable glass. Smart glass or switchable glass is glass or glazing whose light transmission properties are altered when voltage, light, heat and/or gas is applied. Generally, the glass changes from translucent or opaque to transparent, i.e., changing from scattering or blocking some, or all wavelengths of light to letting light pass through. Smart glass technologies include electrochromic, photochromic, thermochromic, gasochromic suspended particle, micro-blind and polymer dispersed liquid crystal devices, for example.

In electrochromic devices, the optical transmittance of the electrochromic material can be changed reversibly by the application of current or a voltage. In thermochromic devices, the optical transmittance of the thermochromic material can be changed depending on the temperature. In gasochromic devices, the optical transmittance of the gasochromic material can be changed by controlling the atmosphere.

In some smart glass, a switchable layer having chromic properties is used. The switchable layer controls light by absorbing light. For these types of chromic materials, they change their opacity between a translucent state to a transparent state. A drawback of such materials is that because they absorb light, the layer is heated and this heat is radiated back into the room or space fitted with the glass. To avoid such a drawback, it is desirable for the switchable layer to control the light by reflecting it instead of absorbing it.

Recent advances in electrochromic materials related to the use of transition-metal hydride electrochromics have led to the development of reflective hydrides which become reflective instead of absorbing and thus switch states between transparent and mirror-like. Using such hydrides, the switchable layer can be reversibly switched between a transparent state by hydrogenation and a mirror state (metal state) by dehydrogenation and/or somewhere therebetween.

The switchable layer characteristically comprises an alloy of one or more kinds of alkaline earth metal selected from calcium, strontium, barium, and magnesium, for example. Such alloys turn into a colorless, transparent state by storing hydrogen, and into a silver-colored mirror state by releasing hydrogen. Many magnesium binary alloys are known to be used as switchable layers such as MgTi, MgNi, MgCa and MgY, for example. Also, a ternary alloy MgZrNi has been used as a switchable layer with improved optical switching properties over binary alloys. The switchable layer may contain trace amounts of elements other than magnesium, calcium, strontium, and barium as an inevitable component.

As mentioned above, there are several methods of reversibly switching the switching layer. Two methods include gasochromic and electrochromic methods. In the gasochromic method, the switchable layer is exposed to a gas containing a concentration of hydrogen sufficient to induce hydrogenation (often around 0.5% hydrogen). For dehydrogenation, the switchable layer is exposed to a gas containing less than the required concentration of hydrogen (such as air). In the electrochromic method, hydrogen is driven into or out of the switchable layer by application of an electric field, causing the switchable layer to reversibly hydrogenate or dehydrogenate, depending on the polarity of the electric field.

Figure 1:
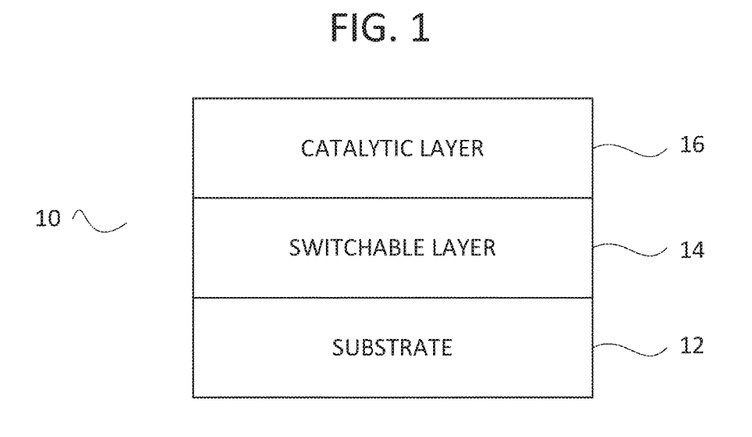
FIG. 1 is a schematic cross-sectional view of a switchable device according to the prior art that may be incorporated into a gasochromic or electrochromic system.

FIG. 1 is a schematic cross-sectional view of a switchable device according to the prior art that can be incorporated into a gasochromic or electrochromic system. The switchable device 10 includes, in the following order, a substrate 12, a switchable layer 14 and a catalytic layer 16. The substrate 12 may be glass or a plastic, for example. The switchable layer 14 may be a magnesium binary alloy or the ternary alloy MgZrNi, for example. The catalytic layer 16 may be palladium, for example.

Figure 2:
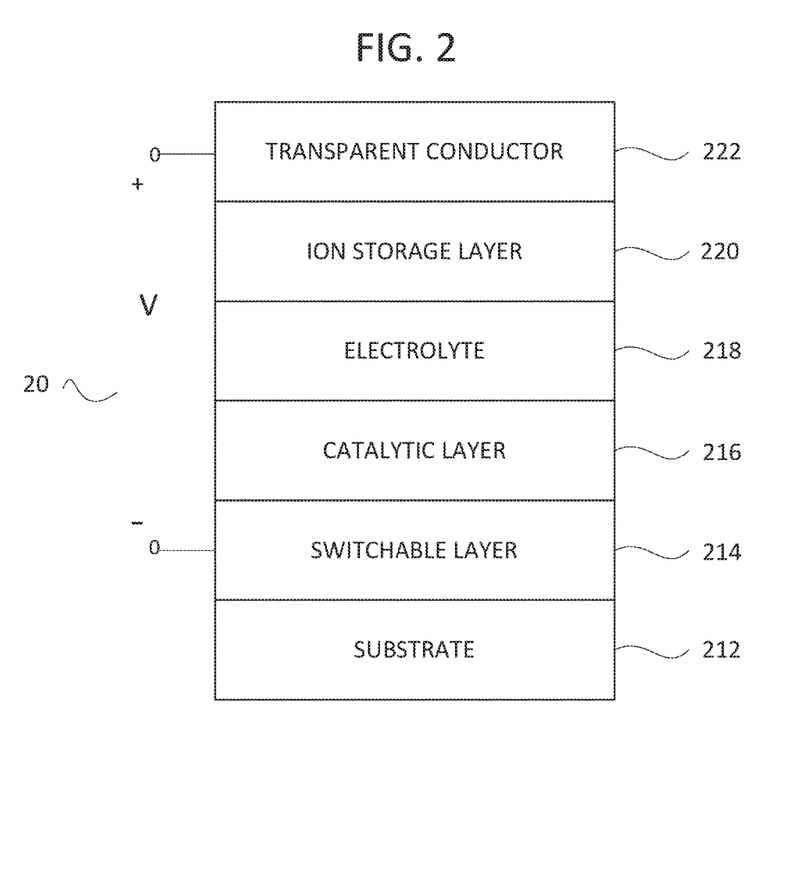
FIG. 2 is a schematic cross-sectional view of the switchable device shown in FIG. 1 incorporated into an electrochromic system.

The switchable device 10 shown in FIG. 1 may be incorporated in an electrochromic switching device comprising a multilayer of solid thin films on a transparent glass or plastic substrate. An example is shown in FIG. 2. On the substrate 212 are deposited the following layers, moving away from the substrate 212: an optical switch layer 214, an optional barrier layer (not shown), a proton injector layer, also referred to as a catalytic layer 216, an optional barrier layer (not shown), a solid electrolyte layer 218, an ion storage layer 220, and a transparent conductor layer 222. While the layer stack is shown in one particular order, the arrangement of the layer stack may be reversed so that on the substrate 212 are deposited the following layers, moving away from the substrate: a transparent conductor layer 222, an ion storage layer 220, a solid electrolyte layer 218, an optional barrier layer, a catalytic layer 216, an optional barrier layer and an optical switch layer 214, for example. A voltage is applied between the transparent conductor 222 and switchable layer 214 The device requires a voltage to change to either state, for example, +5 V to go transparent, −5V to go reflective. At 0V it may remain at whatever state it was at, or it may drift towards a middle, "average" state.

More specifically, when a voltage is applied to the device, hydrogen protons in the ion storage layer 220 move to the optical switch layer 222 and the optical switch layer becomes hydrogenated as will be described hereinafter. When the voltage is reversed, the hydrogen protons move from the switch layer 222 back to the ion storage layer.

An example of such a typical multilayer stack according to FIG. 2 is: $Mg_4Ni/Pd/Al/Ta_2O_5/H_xWO_3$/indium-tin-oxide (ITO) on a transparent substrate. If the optional barrier layers are included, the barrier layer may be comprised of $Al_2O_3$, $TiO_2$, $SnO_2$, SiAlN, or SiAlON and preferably each barrier layer is less than 50 Angstroms. When a positive voltage is applied to the ITO, protons in the $H_xWO_3$ ion storage layer move to the $M_{g4}Ni$ optical switching layer and the $M_{g4}Ni$ film becomes hydrogenated to form transparent $M_gH_2$ and $M_{g2}NiH_4$ hydrides. When the voltage is reversed, the protons return to the ion storage layer and the $Mg_4Ni$ film is dehydrogenated.

Figure 3:
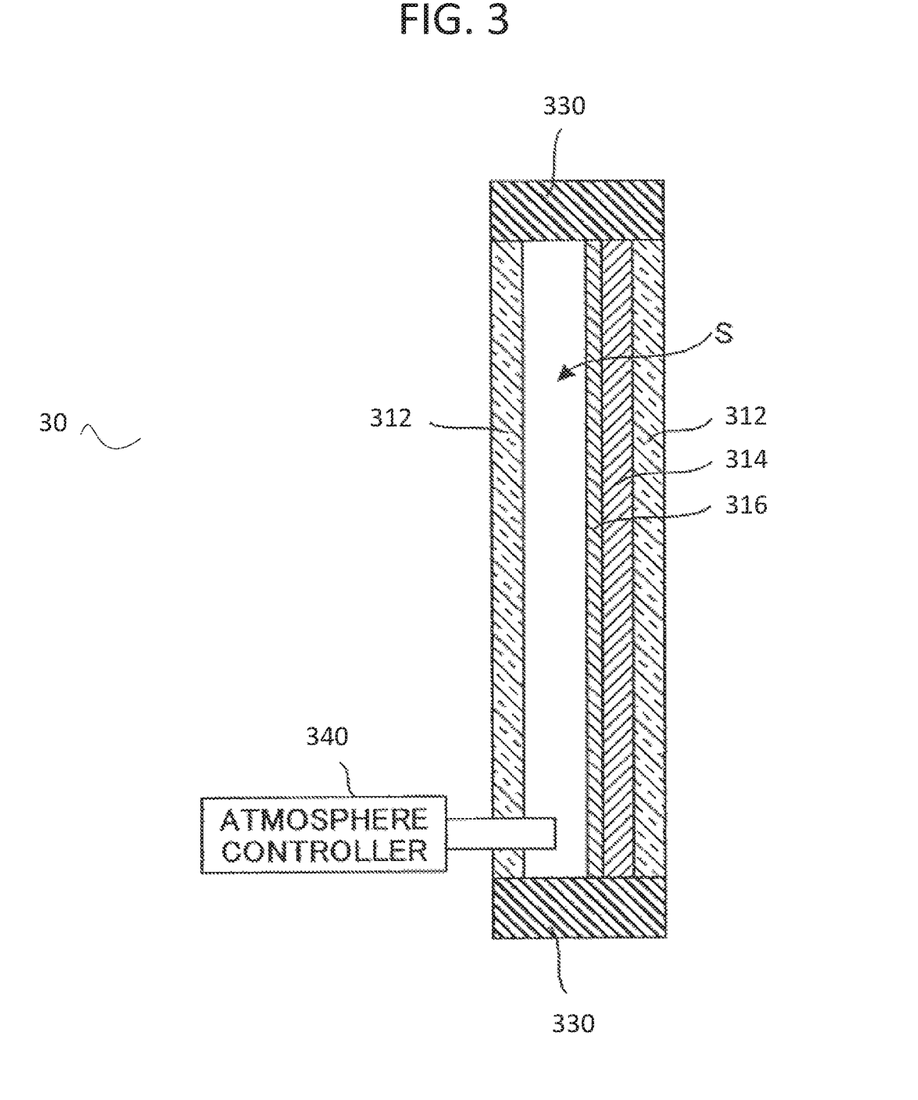
FIG. 3 is a schematic cross-sectional view of the switchable device shown in FIG. 1 incorporated into a gasochromic system.

The switchable device shown in FIG. 1 may also be incorporated in a gasochromic switching device. FIG. 3 is a schematic cross-section of a gasochromic switchable device according to the prior art. A gasochromic switchable device includes an optical switching layer 314 and a catalyst layer 316 disposed on a surface of a substrate 312 such as glass. A second substrate 312 is separated from the first substrate 312 by a gas space S which is sealed by sealers 330. Introduction of a gas including hydrogen into the gas space S by an atmosphere controller 340 causes the switchable layer 314 to switch from its metallic dehydrogenated state to its hydrogenated state. More particularly, when the gas including hydrogen is introduced into the space, the hydrogen reacts with the catalyst layer 316 and hydrogen is passed through to the switching layer 314 which becomes hydrogenated and thus transparent. When the hydrogen gas is removed and replaced with oxygen, the opposite happens and the switchable layer 314 becomes reflective.

It would be desirable to provide a switchable device which can be incorporated into an electrochromic or gasochromic device that has improved durability. Existing devices have suffered from short lifetimes due to oxidation of the switchable layer, loss of hydrogen from the system, diffusion of the catalyst into the switchable layer, or poisoning of the catalyst layer.

It would be desirable, for example, to provide a switchable device with improved optical switching properties such as speed of switching, possibilities for dimming and variable degrees of transparency.

It would be desirable to provide a switchable device that has improved optical transmittance in its transparent state,

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Figure 4:
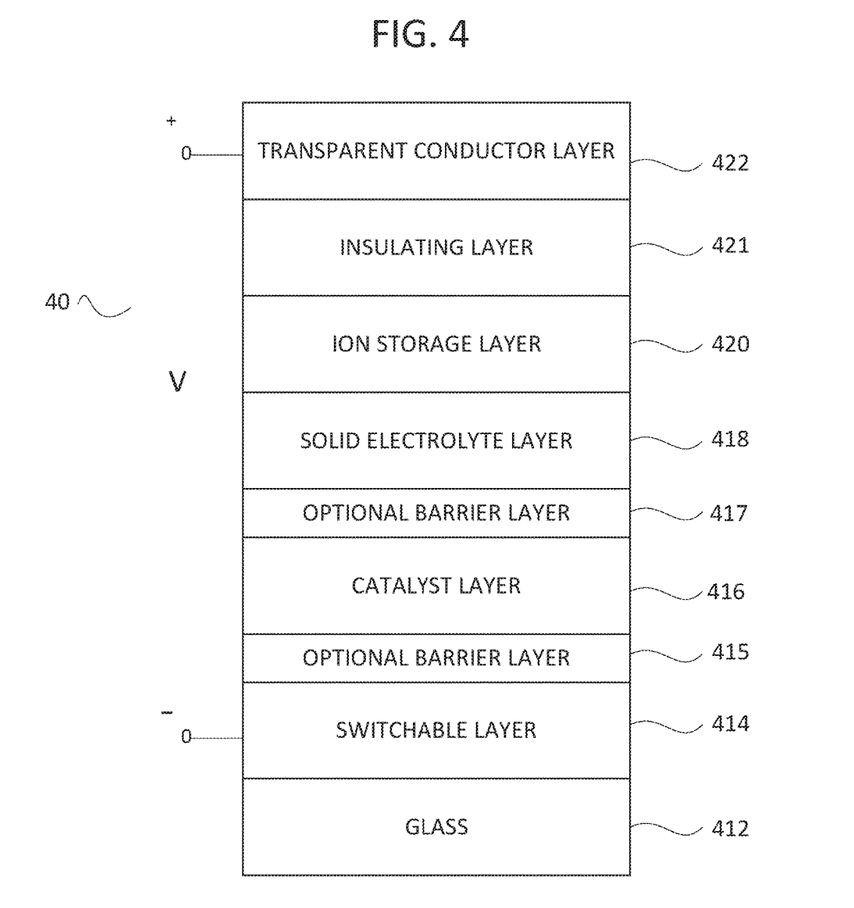
FIG. 4 is a schematic cross-sectional view of a switchable device according to a first embodiment of the present invention.

FIG. 4 is a cross-sectional of a switchable device 40 according to a first embodiment of the present invention incorporated into an electrochromic device. The stack 40 includes the following layers deposited on a substrate 412 in the following order: a switchable layer 414, an optional barrier layer 415, a catalyst layer 416, an optional barrier layer 417, a solid electrode 418, an ion storage layer 420, an optional insulating layer 421 and a transparent conductor layer 422. The switchable layer 414 is preferably formed of a magnesium alloy. More preferably, a ternary alloy of magnesium along with two additional rare earth metals such as yttrium (Y) and titanium (Ti), i.e., MgYTi. In a more preferred embodiment, it has been found that such a ternary alloy in the weight amounts of about 40-60 wt. % Mg, about 30-50 wt. % Y, and about 0-20 wt. % Ti is desirable. More preferably, a ternary alloy in the weight amounts of about 52.25 wt. % Mg, about 41.25 wt. % Y and about 6.5 wt. % Ti is used. It has been found that such a ternary alloy exhibits exceptional properties, particularly a high delta transmission from one state to the other and good stability compared to other Mg ternary alloys. Visible light transmission changes of above 40% (i.e. from 2% to 45%) were achieved, with device lifetimes of at least several thousand switches. The ternary switchable layer formed of a ternary alloy as described above was observed to switch rapidly, usually on the order of about 2 to 20 seconds.

The switchable layer 414, as well as the other layers, may be formed by a conventional method, such as sputtering, vacuum vapor deposition, electron beam evaporation, chemical vapor deposition (CVD), or plating.

The MgYTi switchable layer 414 may be fully mixed or it may be composed of sublayers such as a Y rich layer under a thinner Ti rich layer. If the switchable layer is made of sublayers, each sublayer must be at least 25 Angstroms thick, or at least 10% of the total thickness of the switchable layer.

The catalyst layer 416 is formed either directly on top of the switchable layer 414 or an optional barrier layer 415 may be placed therebetween. The catalyst layer 416 provides the function of promoting hydrogenation or dehydrogenation in the switchable layer 414. The catalytic layer 416 thus ensures a sufficient speed of switching from the transparent state to the mirror or translucent state and vice versa. The catalytic layer 416 may comprise palladium, platinum, a palladium alloy, a platinum alloy, ruthenium, silver and alloys of ruthenium and silver or combinations thereof. Particularly, ruthenium and silver may be suitably used as it has high hydrogen permeability.

The catalytic layer 416 normally has a film thickness of 10 Å to 100 Å. When the thickness is less than 10 Å, sufficient catalytic function cannot be exhibited, while thicknesses exceeding 100 Å provides no improvement in catalytic function with insufficient optical transmittance. The catalytic layer 416 may be formed by a conventional method, such as sputtering, vacuum vapor deposition, electron beam evaporation, chemical vapor deposition (CVD), or plating.

The solid electrolyte 418 is located on top of the catalyst layer 416 or, alternatively, an optional barrier layer 417 may be present. The electrolyte serves to physical separate the ion storage layer and the switchable layer so hydrogen cannot easily diffuce from one into the other, and it provides a barrier to electron flow while allowing ionic flow.

The ion storage layer 420 is deposited on the solid electrolyte layer 418 and preferably is a $H_xWO_3$ layer that can be deposited by conventional methods already described. A transparent conductor layer 422 is deposited either directly on the ion storage layer 420 or an optional insulating layer 421 may be located therebetween. When an electric field is caused to act on the solid electrolyte 418, protons (hydrogen ions) may be introduced into or released from the switchable layer 414.

The transparent electrode 422 has a function of causing an electric field to act on the solid electrolyte layer 418. The transparent electrode 50 may preferably comprise an indium-tin-oxide (ITO) film.

For example, in a preferred embodiment an ITO such as that described in U.S. Pat. No. 8,658,262, entitled "High Quality Emission Control Coatings, Emission Control Glazings, and Production Methods", hereby incorporated in its entirety may be used.

The layer stack 40 is significantly thinner than known electrochromic stacks.

Preferably, the physical thicknesses of the various layers may range from the following: a switchable layer 414 of about 150-250 Å, a catalyst layer 416 of about 30-70 Å, a solid electrolyte layer 418 of about 2,000-3,000 Å, an ion storage layer 420 of about 300-600 Å and a transparent conductor layer 422 of about 1,000-1,500 Å. More preferably, the following layer stack having the materials at the following specified, physical thicknesses is used: 200 Å MgYTi/50 Å Pd/2,500 Å $Ta_2O_3$/500 Å $WO_3$/1,200 Å ITO.

Because the switchable layer 414 is thinner than known layer stacks, i.e., less than 250 Å, the layer 414 does not become fully mirror-like when it is switched from its transparent state. Rather, unlike known devices, the reflection of the switchable layer increase to only 15-50%. And switching does not take place only in the switching layer 414, but also in the ion storage layer. The ion storage layer 420 becomes absorbing when it contains hydrogen. The combined effect of the two layers is that the device both becomes more reflective when viewed from the side with the switchable layer, and darker when viewed from the side with the ion storage layer.

In addition, because the transparent conductor layer 422 is thicker, it is more conductive and thus has a lower sheet resistance than previously known stacks. For example, prior art stacks typically have a sheet resistance that is greater than 35 Ω/sq. whereas the sheet resistance of the preferred embodiment of the invention is about 12.5 Ω/sq, which improves the uniformity and power consumption of the device.

If an insulating layer 421 is added between the transparent conductor and the ion storage layer, this helps prevent shorting across the device and improves the uniformity of the transition. Preferably the insulating layer may be $SiAlO_xN_y$, although other insulators may be used.

The light control operation of the device shown in FIG. 4 will now be described. The light control operation is carried out by applying voltage between the ion storage layer 420 and the switchable layer 414. Because the device is not a good electrical conductor, very few electrons flow through the device. This is good because otherwise it would use a lot of energy. Instead of electrons, the hydrogen moving through the device provides an ionic current.

Specifically, if a positive voltage is applied to the transparent conductor layer 422 and a negative voltage is applied to the switchable layer 414, when the electrochromic device 40 is in a reflective state, protons stored in the ion storage layer 420 diffuse into the switchable layer 414 through the solid electrolyte layer 418 and the catalyst layer 416 which brings about hydrogenation so that the reflection characteristics change from a mirror state to a transparent state. The catalyst layer 416 has the function of promoting the transfer of protons between the solid electrolyte layer 418 and the switchable layer 414. Conversely, if negative voltage is applied to the ion storage layer 420 and positive voltage is applied to the switchable layer 414 when the device 40 is in its transparent state, hydrides within the switchable layer 414 are dehydrogenated and the reflection characteristics return from a transparent state to a mirror state. The released hydrogen returns in the form of protons through the catalyst layer 416 and the solid electrolyte layer 418 to the ion storage layer 420 and is stored therein.

Figure 5:
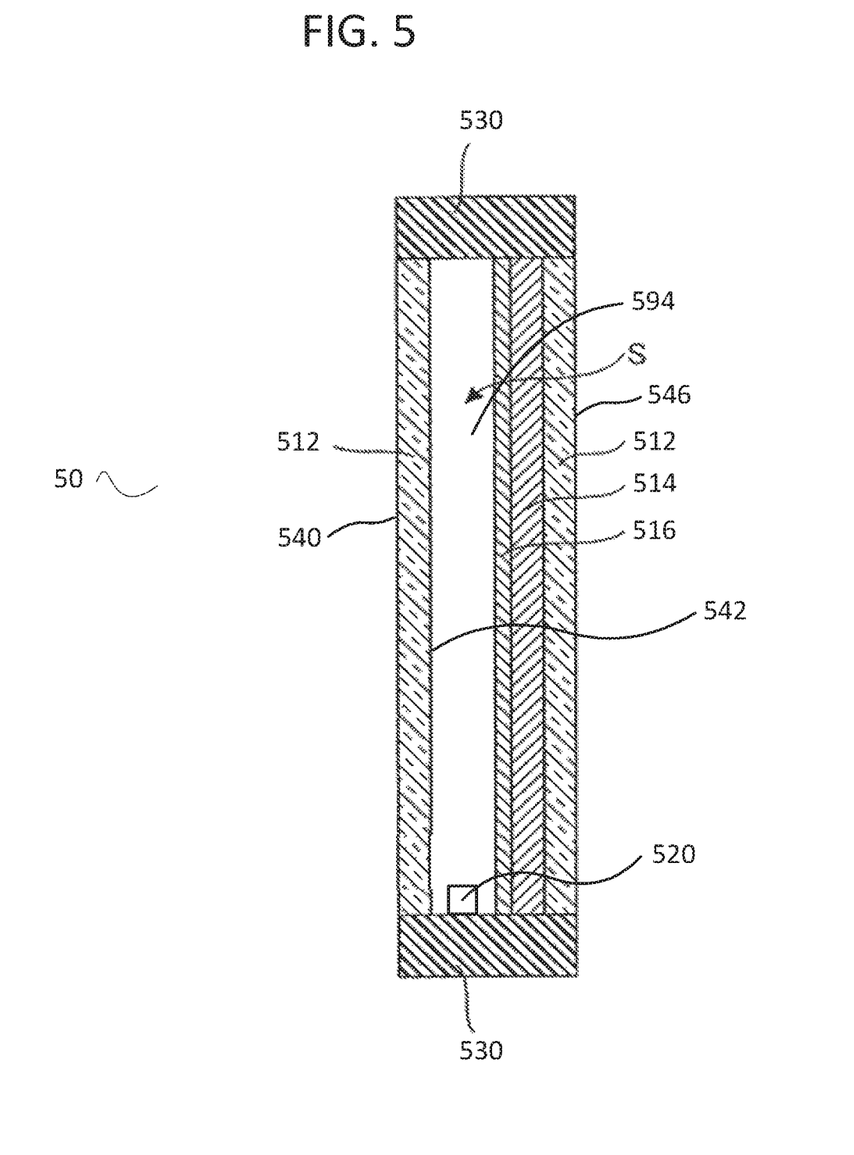
FIG. 5 is a schematic cross-sectional view of a switchable device according to an embodiment of the invention incorporated into a gasochromic device.

FIG. 5 is a schematic cross-sectional view of a switchable device according to an embodiment of the invention incorporated into a gasochromic device similar to that shown in FIG. 2.

A binary or ternary Mg alloy as previously described is deposited as a thin film on a substrate 512 such as glass, with a catalyst layer 516 (Pt, Pd, Au, Ag, Ru, a combination thereof or other catalyst) thereover. A porous block 520 or powder made of Mg alloy (the same alloy or other magnesium alloy) is also placed inside the IGU airspace S. The block or powder may also contain a catalyst but it need not have to. This powder or porous block 520 readily absorbs hydrogen (which can be introduced into the airspace during manufacturing). Then it may be heated (with an electrical resistance heater or any other suitable device) to cause the hydrogen to desorb from the material and increase the hydrogen concentration inside the airspace S. When the hydrogen concentration gets above about 0.4%, the switchable layer 10 is hydrogenated via the catalytic layer 516, so that the switchable layer 10 turns into the transparent state. When the block 520 or powder is allowed to cool, it becomes a getter for hydrogen and, when equilibrium is reached, the hydrogen in airspace S will largely be reabsorbed by the block 520 or powder thereby lowering the hydrogen concentration in the airspace S. This causes layer 514 to go back to its reflective state.

The block 520 or powder creates a hydrogen reservoir and provides unique benefits over known gasochromic systems. First, because it manages the hydrogen concentration in the IGU, it simplifies the incorporation of a gasochromic system in an IGU by not requiring gas lines or pumps to be wired to the IGU. Also, it increases the longevity of the system because the high surface area of the block or powder can store a lot of hydrogen and thus the IGU can cycle many times between different states before losing its effectiveness.

Alternatively, instead of having a block 520 or powder, the Mg alloy layer with catalyst on the glass may contain hydrogen and thus is transparent. That layer could be electrically heated to cause the hydrogen gas to desorb and the layer to switch to its metallic state. Letting the layer cool would then make it go back to clear.

Insulating glasses are gaining increasing popularity among homes, and more and more newly built houses are fitted with them. Thus, by fitting the switchable mirror element according to an embodiment of the present invention to the inside of an insulating glass, the internal space can be utilized as the gas-filled chamber S for switching.

When the embodiments of the invention are incorporated into an IGU, a "first" (or "#1") surface 540 is exposed to an outdoor environment. Accordingly, it is the #1 surface that radiation from the sun first strikes. Moving from the #1 surface 540 toward the interior of the building, the next surface is the "second" (or "#2") surface 542. Moving further toward the interior of the building, the next surface is the "third" (or "#3") surface 544, followed by the "fourth" (or "#4") surface 546. This convention is carried forward for IG units having more than four major pane surfaces.

The embodiments of the invention may also be used in a privacy glazing product. In such a product, the glazing is switchable between a transparent state characterized by a very high visible transmission to a privacy state characterized by an extremely low visible transmission, below 1%.

Also, a sensor such as a photodiode or LED mounted either inside or against a surface of the IGU may be used to monitor the reflection or transmission of the coating which could then be fed back to a controller for allowing specific intermediate levels of transmission or reflection to be maintained.

In order to provide a privacy coating, the light transmitted through the coating needs to be scattered. Preferably small angle scattering, i.e., less than 2.5 degrees, is preferred. Scattering the transmitted light could be accomplished by roughening or texturing the switchable layer 414. Such roughening or texturing could be accomplished through reactive ion etching or wet chemical etching or through a controlled growth of the switchable layer 414 to create a textured surface. Also, internal scattering sites may be created in the switchable layer 414 by including intentional impurities in the switching layer 414.

While some preferred embodiments of the invention have been described, it should be understood that various changes, adaptations and modifications may be made therein without departing from the spirit of the invention and the scope of the appended claims.

What is claimed is:

1. A switching device comprising:
   a substrate; and
   a film capable of undergoing a reversible change in light transmittance, the film comprising a transition metal composition which includes magnesium, and two transition metals chosen from the group consisting of Y, Ti wherein switching occurs by the formation or decomposition of a hydride, wherein the film has the following composition:
   about 40-60 wt. % Mg, about 30-50 wt. % Y and about 0-20 wt. % Ti.

2. A switching device according to claim 1 wherein the film further comprises a catalyst layer overlying the film.

3. A switching device according to claim 2 wherein the film has a thickness less than 250 Å.

4. A switching device according to claim 2 wherein the film has a thickness of about 200 Å.

5. A switching device according to claim 2 wherein the film has a thickness of about 150-250 Å and the catalyst layer has a thickness of about 30-70 Å.

6. A switching device according to claim 2 wherein the film has a thickness of about 200 Å and the catalyst layer has a thickness of about 50 Å.

7. A switchable device according to claim 2 further comprising the following layers over or under the catalyst layer:
   a solid electrolyte layer;
   an ion storage layer;
   a transparent conductor layer.

8. A switchable device according to claim 7 further comprising an insulating layer located between the ion storage layer and the transparent conductor layer.

9. The switchable mirror element according to claim 2, wherein the catalytic layer includes palladium, platinum, a palladium alloy, or a platinum alloy.

10. The switchable mirror element according to claim 2, comprising a buffer layer disposed on the catalytic layer on an opposite side to the film, the protection layer having a hydrogen permeability and water repellency.

11. A switching device according to claim 1 wherein the film has the following composition:
    52.25 wt. % Mg, 41.25 wt. % Y, 6.5 wt. % Ti.

12. A switching device according to claim 1 wherein the film can be reversible switched from a reflective, metallic state to a transparent state.

13. An insulating glass comprising:
    two glass plates; and
    the switchable device according to claim 1 disposed on an inner surface of one of the two glass plates.

14. The insulating glass according to claim 13, comprising an atmosphere controller configured to charge or discharge hydrogen or oxygen into or from a gap between the two glass plates.

15. The insulating glass according to claim 14, further comprising a porous block comprising an alloy of Mg located in the gap.

16. A switchable layer stack comprising:
    a switchable layer having a chromic property enabling the switchable layer to be reversibly changed between a transparent state by hydrogenation and a mirror state by dehydrogenation; and
    a catalytic layer disposed on the switchable layer and configured to promote hydrogenation or dehydrogenation in the switchable layer,
    wherein the switchable layer includes an alloy of magnesium and at least two transition metals chosen from the group Y, Ti, wherein the switchable layer has the following composition:
    about 40-60 wt. % Mg, about 30-50 wt. % Y and about 0-20 wt. % Ti.

* * * * *